United States Patent [19]

Vigesdal

[11] 4,149,859

[45] Apr. 17, 1979

[54] PROCESS FOR COOLING AND SEPARATION OF DRY PARTICULATE MATTER FROM A HOT GAS

[75] Inventor: Njål Vigesdal, The Hague, Netherlands

[73] Assignee: Shell Internationale Reserach Maatchappij B.V., The Hague, Netherlands

[21] Appl. No.: 842,327

[22] Filed: Oct. 14, 1977

[30] Foreign Application Priority Data

Oct. 21, 1976 [GB] United Kingdom ..................... 43713

[51] Int. Cl.² ........................................... B01D 47/00
[52] U.S. Cl. ......................................... 55/89; 55/93; 55/222; 55/257 HE; 261/DIG. 54; 252/373; 48/197 R
[58] Field of Search ..................... 55/68–73, 55/222, 257 HE, 84, 89, 92–95; 261/DIG. 54; 48/206, 210, 197 R; 252/373

[56] References Cited

U.S. PATENT DOCUMENTS

| | | | |
|---|---|---|---|
| 2,677,439 | 5/1954 | Hedberg | 55/89 |
| 2,746,564 | 5/1956 | Williams | 55/89 |
| 3,618,296 | 11/1971 | Auer et al. | 55/89 |
| 3,620,700 | 11/1971 | Schlinger et al. | 252/373 |
| 3,639,261 | 2/1972 | Slater | 252/373 |
| 3,963,457 | 6/1976 | Hess | 48/206 |
| 4,049,570 | 9/1977 | Gernhardt et al. | 252/373 |
| 4,054,424 | 10/1977 | Staudinger | 48/210 |

FOREIGN PATENT DOCUMENTS

| | | | |
|---|---|---|---|
| 809888 | 3/1959 | United Kingdom | 301/41 R |
| 1458448 | 12/1976 | United Kingdom | 246/182 R |

*Primary Examiner*—Bernard Nozick

[57] ABSTRACT

A proces for separation of dry particulate matter, such as molten slag droplets and/or solid particles, from a hot gas is disclosed in which the gas is first cooled to a temperature in the range from 50° to 500° C. The greater part of the particulate matter is removed from the cooler gas by means of at least one cyclone separator. The gas is then scrubbed with water in a scrubber. Cooling of the hot gas to the lower temperature range is performed by injecting into the hot gas at least part of a purified product gas formed by the process and at least part of an aqueous suspension of particulate matter obtained during scrubbing.

13 Claims, 1 Drawing Figure

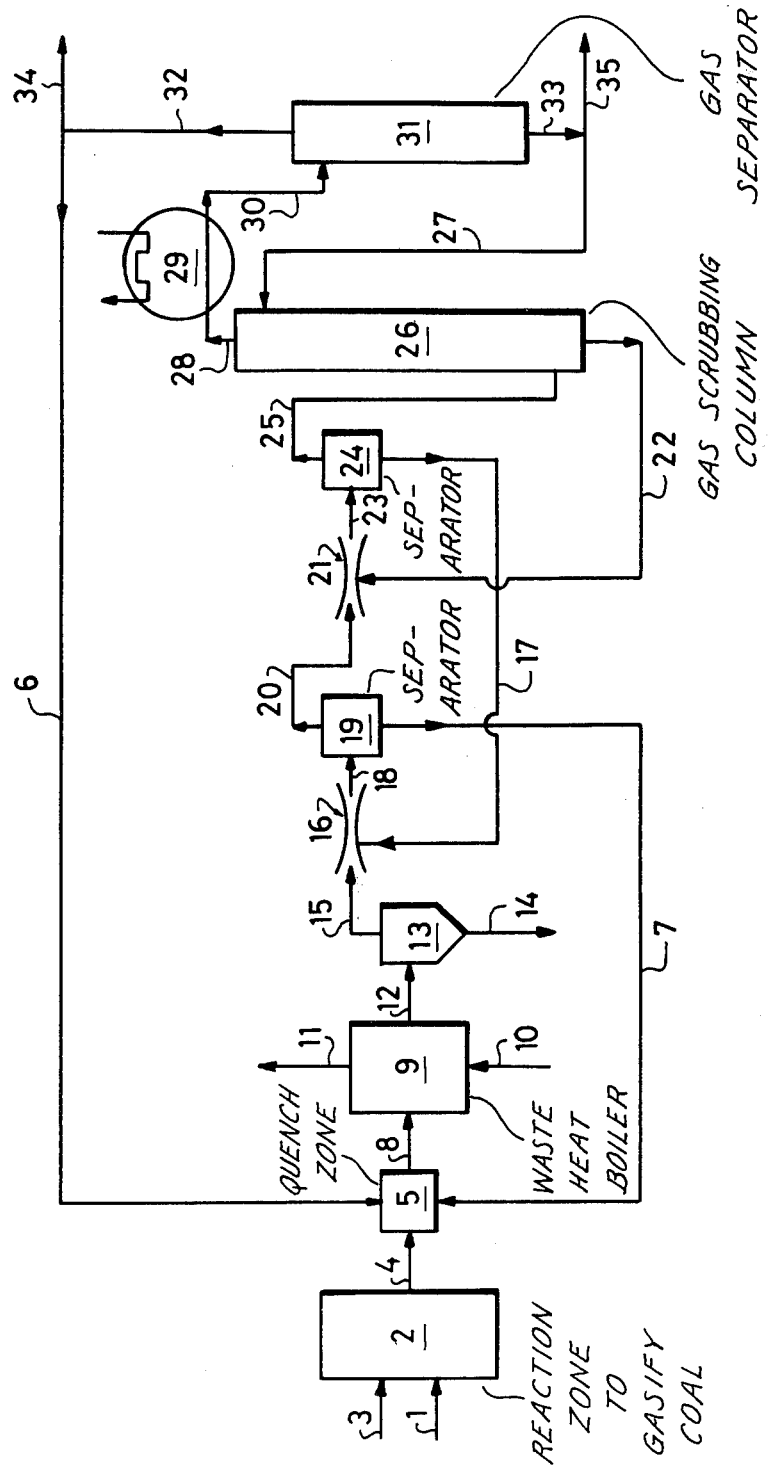

PROCESS FOR COOLING AND SEPARATION OF DRY PARTICULATE MATTER FROM A HOT GAS

BACKGROUND OF THE INVENTION

The field of this invention is removal of solid particulate matter from hot gas, such as is formed during coal gasification.

Gases containing molten ash or slag droplets often present difficulties in processing, because deposits tended to build up on walls, valves and outlets of the processing equipment and interfered with good operation, even leading to complete blocking of the equipment. Although sometimes molten contaminants in a gas were so thinly liquid, i.e., non-viscous, that removal of the greater part thereof did not cause problems, as a rule a mist of molten particles remained behind in the gas, which, upon cooling, became sticky and then tended to cause the processing difficulties mentioned.

These sticky particles could be completely or partly in the molten state and they could comprise metals and salts. When cooled down to a sufficiently low temperature these particles would completely solidify or at least become so solidified of stiff that their stickiness disappeared. Once the particles could be lowered in temperature to a level where they were no longer sticky, they could be removed by known mechanical techniques such as cyclones, bend separators, filters and similar devices. However, a wide melting range over which the particles were sticky rather than one melting point was often involved, so such a melting range could in some instances even cover hundreds of degrees centigrade.

An important process in which such sticky particles are formed is the manufacture of gases containing carbon monoxide by incomplete combustion of ash-containing coal. Upon combustion of coal in a reactor, the ash in the coal produced slag. On leaving the reactor, the gas produced by combustion usually had a temperature at which the ash had a high fluidity, e.g. a temperature higher than 1300° C., and the emerging gas thus contained a mist of molten slag particles. For further processing the crude product gas had to be cooled down to a lower temperature, e.g. 100° C. The molten particles from coal usually became sticky in the temperature range from 900°–1500° C., so that the difficulties with deposits building up in processing equipment tended to arise as the product gas was cooled for further processing.

SUMMARY OF THE INVENTION

The invention relates to a process for the separation of dry particulate matter from a hot gas containing molten slag droplets and/or solid particles in which the gas is first cooled to a temperature in the range from 50° to 500° C., the greater part of the particulate matter is then removed from the gas by means of at least one cyclone and the gas is subsequently scrubbed with water. The process is characterized in that at least part of an aqueous suspension of particulate matter obtained in the scrubbing and at least part of the purified product gas are injected into the hot gas. In principle, all hot gases which contain molten ash or slag droplets and/or solid particles can be purified by the present process. This process is particularly suitable for the purification of hot crude synthesis gas prepared by means of partial oxidation of powdered coal at a temperature in the range from 1000° to 2000° C. In addition to hydrogen, carbon monoxide, carbon dioxide, light hydrocarbons and water vapor, this gas also contains molten ash or slag and generally gaseous by-products, such as sulphur compounds and traces of $NH_3$ and HCN. Depending on the nature of the coal and the reaction temperature, the gas may contain solid particles, mainly consisting of ash. The molten ash or slag droplets and the solid particles are completely removed from the synthesis gas by means of the present process.

According to the invention, the hot feed gas to be purified is first cooled to a temperature in the range from 50° to 500° C. in order to solidify the slag droplets or particles in the feed gas. The cooling of the hot feed gas is preferably achieved by the following consecutive stages:

(a) injecting at least part of a cold purified product gas therein;

(b) injecting at least part of an aqueous suspension of particulate matter obtained in a subsequent scrubbing section therein; and (c) passing the mixture of gas, steam and solidified particulate matter obtained in the two preceding stages through a waste heat boiler in which it is indirectly cooled by water which is converted into steam.

According to a preferred embodiment of the invention the hot gas is passed through a tubular zone near the entrance of which cold, particle-free purified product gas is introduced in such a way that a protective gas shield is formed against the wall of the tubular zone, which shield prevents the hot gas from coming into contact with the wall of the zone, while in that zone at the same time an aqueous suspension of particulate matter is added to the hot gas.

BRIEF DESCRIPTION OF THE DRAWINGS

Reference is now made to the drawing which schematically illustrates apparatus to perform the process of this invention. In the drawing, conventional auxiliary equipment such as valves, pumps, compressors, control instruments and the like are generally not shown.

DESCRIPTION OF PREFERRED EMBODIMENT

According to the process of the invention, an ash-containing carbonaceous material is introduced via a line 1 into a reaction zone 2 where it is gasified by partial oxidation with an oxygen-containing gas which is supplied to the reaction zone 2 via a line 3. A hot crude synthesis gas containing slag droplets is withdrawn from the reaction zone 2 and is supplied via a line 4 to a quench zone 5 where it is quenched with a cold purified recycle gas, introduced via a line 6, and with a suspension of particulate matter, introduced via a line 7. In the quench zone 5 all the slag droplets in the hot crude synthesis gas solidify to solid particles and all the water of the suspension of particulate matter evaporates while the hot crude synthesis gas is cooled and mixed with the injected recycle gas and the water vapour originating from the injected suspension, forming a mixture of gas, water vapor and particulate matter.

The gas/water vapor/particulate matter mixture is withdrawn from the quench zone 5 via a line 8 and is introduced into a waste heat boiler 9 where it is further cooled by means of boiler feed water being introduced via a line 10. The boiler feed water is converted to steam which is withdrawn via a line 11. The cooled gas/water vapor/particulate matter mixture is withdrawn from the waste heat boiler 9 via a line 12 and introduced into a cyclone separator 13. Here the greater part of the particulate matter is separated from the mixture and removed through a line 14. The remainder of the particulate matter is passed through a line 15 together with the gas/water vapor mixture to a venturi scrubber 16 and here contacted with an aqueous suspension of particulate matter which is supplied through a line 17.

A mixture of gas, water vapor, water droplets and particulate matter is formed in the venturi scrubber 16 and is passed through a line 18 to a separator 19. Here an aqueous suspension of particulate matter is separated from a gas/water vapor mixture. The aqueous suspension leaves the separator 19 through the line 7 and is recycled therethrough to the quench zone 5. The gas/water vapor mixture in separator 19, still containing some particulate matter, is passed through a line 20 to a venturi scrubber 21 where it is contacted with an aqueous suspension of particulate matter being supplied via a line 22. A mixture of gas, water vapor, water droplets and particulate matter is formed in the venturi scrubber 21 and is passed through a line 23 to a separator 24. Here again, an aqueous suspension of particulate matter is separated from a gas/water vapor mixture. The aqueous suspension so separated in separator 24 is withdrawn from the separator 24 through the line 17 and is recycled via this line to the venturi scrubber 16. The gas/water vapor mixture in separator 24, which contains only traces of particulate matter, is passed through a line 25 to the bottom of a gas scrubbing column where it is contacted countercurrently with water being supplied via a line 27.

In the gas scrubbing column 26, the last traces of particulate matter are removed from the gas/water vapour mixture whereby an aqueous suspension of particulate matter is formed. The suspension so formed is recycled via the line 22 to the venturi scrubber 21. The purified gas/water vapor mixture is withdrawn from a scrubbing column 26 via a line 28 and passed to a cooler 29. In the cooler 29 the purified gas/water vapor mixture is so cooled that the greater part of the water vapor which it contains condenses. The mixture of dried gas and cold condensate is passed via a line 30 to a separator 31 where it is separated into dried gas, which is withdrawn via a line 32, and cold condensate, which is withdrawn via a line 33. Part of the dried gas is removed as a final product from the system via line 34 and part is recycled to the quench zone 5 via the line 6. Part of the cold condensate is removed via a line 35 and part is recycled to the top of the scrubbing column 26 via the line 27.

The invention will be further elucidated with reference to an Example.

EXAMPLE

In a process as described above with reference to the figure, 1248 kg/h (kilograms per hour) of crude synthesis gas were treated. This gas originated from the coal gasification unit 2, had a temperature of 1500° C. and contained 95 kg/h of water vapor and 33 kg/h of slag droplets. In the quench zone 5, suspension was added to this gas at a rate of 75.5 kg/h which suspension consisted of 72 kg/h of water and 3.5 kg/h of ash particles. In addition, 742 kg/h purified recycled gas were added to the crude gas in the quench zone 5.

In the quench zone 5 all the added water evaporated, the slag droplets solified and the ash particles were absorbed in the gas/water vapor mixture. This mixture was passed via the waste heat boiler 9, to the cyclone 13 where it was separated into 33 kg/h of dry solid material and 2032.5 kg/h of gas/water vapor/particulate matter mixture containing 1860 kg/h of synthesis gas, 169 kg/h of water vapor and 3.5 kg/h of particulate matter. The dry solid matter was removed from the bottom of the cyclone separator 13 and the gas/water vapor/particulate matter mixture issued from the cyclone separator 13 at the top. This mixture, which had a temperature of 155° C., was subsequently contacted in the venturi scrubber 16 with 103 kg/h of a suspension, which contained 0.2 kg/h of particulate matter.

The mixture of synthesis gas, water droplets, water vapor and particulate matter which formed in the venturi scrubber 16 was passed to the separator 19 and there separated into 75.5 kg/h of suspension of particulate matter in water and 2060 kg/h of gas/water vapor mixture. A temperature of 134° C. prevailed in the separator 19. The suspension was recycled to the quench zone 5. The gas/water vapor mixture which had a temperature of 134° C. was contacted in the venturi scrubber 21 with 106 kg/h of a suspension, which contained 0.01 kg/h particulate matter and which originated from the bottom of the gas scrubbing column 26.

The mixture of synthesis gas, water droplets, water vapor and particulate matter which formed in the venturi scrubber 21 was separated in the separator 24 into 103 kg/h of suspension of particulate matter in water and 2063 kg/h gas/water vapor mixture. A temperature of 133° C. prevailed in the separator 24. The suspension was recycled to venturi scrubber 16. The gas/water vapor mixture was passed into the bottom of the gas scrubbing column 26, where it was scrubbed countercurrently with a downwardly flowing condensate. The condensate entering at the top of the gas scrubbing column 26 had a temperature of 40° C.

Aqueous suspension was separated from the bottom of the gas scrubbing column at a rate of 106 kg/h, which suspension contained 0.01 kg/h of particulate matter. This suspension was recycled to the venturi scrubber 21. 2052 kg/h of gas/water vapor mixture issued from the top of the gas scrubbing column 26 at a temperature of 130° C. and were passed to the cooler 29 where it was cooled to 40° C. At this stage 190 kg/h of water condensed and were separated in separator 31. A mixture of 1858 kg/h gas and 4.5 kg/h of water vapor was removed from separator 31. This mixture no longer contained any particulate matter. 1120 kg/h of purified gas were withdrawn from the system as a final product and 742 kg/h purified gas were recycled to the quench zone 5.

With the present invention, as described hereinabove, cooling of the hot crude gas by intimate mixing with the purified product gas and the aqueous suspension, both having a lower temperature, is very effective and involves no delay. Cooling can thus be rapidly effected in a relatively small space. This has great advantages, because the temperature range in which the particles are sticky is passed through rapidly, so that the cooling zone can be small. Further, the protective gas shield formed against the wall of the tubular zone, in a manner to be set forth below, then needs to be maintained only in that small area. The quantity of cooling gas required naturally depends on the desired degree of cooling, on the nature and the temperature of the cooling gas and of the hot product gas. A good shielding effect is obtained when the volume ratio between the supplies of cold shielding gas and hot gas is at least 0.05. Advantageously, this ratio will not be chosen greater than 0.5, since it is only desirable to cool the hot gas to such an extent that the slag droplets are not sticky any more.

The apparatus preferably to be used in the quench zone 5 during the process according to the invention comprises a tube that is connected to a source of hot gas to be cooled, e.g. a coal gasification reactor. The tube is provided with an annular shielding gas inlet located in the vicinity of that connection. The inlet is provided with means to give the shielding gas a rotary motion in the annular inlet. The tube is further provided with two or more inlets for introducing the aqueous suspension in a radial direction, which inlets are equally spaced around the circumference of the tube downstream of the said annular inlet for shielding gas and in the vicinity thereof.

The shielding gas can be introduced in various ways. A stable gas shield is obtained when the shielding gas is introduced with a tangentially directed velocity component. In this way, an intimate contact is achieved between the shielding gas and the wall. If required, the shielding gas may be introduced at more than one place spaced lengthwise along the tubular zone. After at least part of the cold product gas has been injected into the hot gas, at least part of the aqueous suspension of particulate matter obtained in the scrubbing is advantageously injected into the hot gas.

The aqueous suspension is preferably introduced through radially directed inlets located at about the same cross-sectional plane of the tubular zone and equally spaced around the circumference of the tubular zone. Thus, the aqueous suspension is suitably introduced into the hot product gas in the form of jets through the shielding gas. This will cause little disturbance in the shielding gas. In addition, the aqueous suspension inlets are advantageously not located near the stream of hot gas containing sticky particles, so that fouling of the inlets is prevented. By introducing shielding gas in the vicinity of these inlets, no sticky particles can be deposited on the inlets of the aqueous suspension.

The diameter of the radially directed inlets of the aqueous suspension is preferably chosen such that the jets of the aqueous suspension are so strong that they can reach the center of the tubular zone. Stable jets are obtained at a linear velocity of 5–30 m/s.

The aqueous suspension is preferably introduced close to and downstream of the inlet of the shielding gas. Naturally, the gas shield is most effective where the shield is formed. The hot gas is in contact with the shielding gas, which causes mixing to occur, as a result of which the gas shield will gradually become thinner and will finally disappear. It is therefore important that within the area where the gas shield is effective the cooling of the hot gas has progressed to the stage where the slag particles are not sticky any more.

In order to achieve a satisfactory result by means of the present process, two requirements must be met:
(a) the water of the aqueous suspension which has been injected into the hot gas must remain evaporated substantially completely after the hot feed gas has been cooled;
(b) the scrubbing water with which the gas is scrubbed must remain approximately the same in volume as it circulates through the scrubbing stages.

The first requirement is met if the gas/water vapor mixture after the cooling has a temperature which is above its dew point. The temperature of the cooled gas/water vapor mixture is therefore at least 50° C. If this temperature were too high, too much scrubbing water would evaporate during the following scrubbing treatment of the gas. For that reason, the temperature of the cooled gas/water vapor mixture is not higher than 500° C.

The second requirement is met if the quantity of water which evaporates after injection of the aqueous suspension into the gas recondenses in one or more of the following scrubbing stages. This may be achieved by pre-cooling the aqueous suspension of particulate matter which is recycled to the final scrubbing stage to a temperature in the range from 25° to 125° C. and/or by supplying cold condensate obtained in the drying of the final purified product gas to the last scrubbing stage. If the liquid to be recycled to the last scrubbing stage is not cold enough, too much water is discharged with the purified gas and it is necessary to add water from outside to one or more scrubbing stages in order to make up the discharged water. After the gas has been purified in the manner described above, it is preferably dried. This may advantageously be done by cooling the gas and separating the water which then condenses. As mentioned above, preferably at least part of the condensate thus obtained is recycled to the final scrubbing stage in order to cool it.

After the greater part of the particulate matter has been separated from the gas/water vapor mixture by means of one or more cyclone separators, the gas is scrubbed with water, advantageously in at least two scrubbing stages. It should be understood, however, that more than two scrubbing stages, operating in the manner set forth below, may be used.

In the case of two or more scrubbing stages, at least part of the aqueous suspension of particulate matter obtained from the first scrubbing stage is injected into the hot gas and at least part of the aqueous suspension of particulate matter obtained from each consecutive scrubbing stage is injected into the feed gas of the preceding scrubbing stage. Such an operation may be effected by means of one or more venturi scrubbers, distributing trays, packed columns or nozzles, venturi scrubbers being preferred. After each scrubbing stage the gas and the resultant aqueous suspension of particulate matter are separated, preferably in a separator. The gas is passed to the following scrubbing stage, while the suspension may be divided. At least part is passed to the preceding scrubbing stage, the remainder, if any, being recycled to the stage from which it originated.

The gas which has passed the one or more cyclone separators is scrubbed, preferably in a venturi scrubber, during which an aqueous suspension originating from the first contacting stage may be added. The first contacting stage preferably consists of a venturi scrubber. After the gas has passed through this stage, the resultant mixture of gas and aqueous suspension is advantageously separated in a separator into a partly purified gas and an aqueous suspension of particulate matter which is at least partly injected into the hot gas, the remainder, if any, being recycled to the first venturi scrubber. This contact between the hot gas and recycled aqueous suspension is preferably effected in a tubular zone in which the water evaporates from the suspension, after which the gas/water vapor/particulate matter mixture is passed, preferably via a waste heat boiler to the one or more cyclone separators in order to separate the greater part of the particulate matter.

The gas originating from the first separator is preferably scrubbed in at least one further venturi scrubber although more than one may be used. After each further venturi scrubber, the resulting gas/water vapor/aqueous suspension mixture is separated into a gas/water vapor mixture and an aqueous suspension particulate matter. The gas originating from the last separator is preferably scrubbed in a gas scrubbing column countercurrently with water. The gas scrubber preferably consists of a packed bed of filler elements, such as Raschig rings or Berl saddles. The aqueous suspension of particulate matter originating from the bottom of the gas scrubbing column is preferably at least in part pumped to the preceding venturi scrubber, the remainder, if any, being recycled to the gas scrubbing column. The purified gas leaving the gas scrubber is preferably cooled to a temperature in the range of from 0° to 100° C., so that practically all water vapor remaining therein condenses. The resulting condensate is then separated from the gas and preferably at least in part recycled to the gas scrubbing column.

The foregoing disclosure and description of the invention are illustrative and explanatory thereof, and various changes in the size, shape and materials as well as in the details of the preferred embodiment may be made without departing from the spirit of the invention.

I claim:

1. A process for the separation of dry particulate matter from a hot gas containing molten slag droplets, comprising the steps of:
   (a) cooling the hot gas to a temperature in the range from about 50° to about 500° C.;
   (b) separating the greater part of the particulate matter from the cooled gas of step (a);
   (c) scrubbing the gas of step (b) with water to form scrubbed gas and an aqueous suspension of particulate matter;
   (d) thereafter treating the gas and forming a purfied product gas from the scrubbed gas; and
   (e) injecting into the hot gas for effecting said cooling of step (a) at least part of the aqueous suspension of particulate matter obtained in said step of scrubbing and part of the purified product gas.

2. A process as claimed in claim 1, further including the step of:
   indirectly cooling the mixture of aqueous suspension of particulate matter, the purified product gas and the hot feed gas after said step of injecting during cooling.

3. A process as claimed in claim 1, wherein the aqueous suspension of particulate matter is injected into the hot feed gas as a series of radially directed jets.

4. A process as claimed in claim 1, further including the step of:
   (a) cooling the purified product gas; and
   (b) separating condensate from the product gas.

5. A process as claimed in claim 4, characterized in that at least part of the condensate so formed is used in the gas scrubbing column as scrubber water.

6. A process as claimed in claim 1, wherein the purified product gas is injected into the hot gas before injection of the aqueous suspension of particulate matter into the hot gas during said step of injecting.

7. A process as claimed in claim 6, wherein the purified product gas is injected with a tangentially directed velocity component into the hot feed gas passing through a tubular zone so that a cold protective gas-shield is formed against the wall of the zone.

8. A process as claimed in claim 1, in which said step of scrubbing is performed in at least two scrubbing stages and wherein said step of injecting includes injecting at least part of an aqueous suspension of particulate matter obtained in a first scrubbing stage into the hot gas and further including:
   injecting at least part of an aqueous suspension of particulate matter obtained from each subsequent scrubbing stage into the feed gas of the preceding scrubbing stage.

9. A process as claimed in claim 8, wherein said step of injecting an aqueous suspension into the feed gas of the preceding scrubbing stage comprises:
   contacting at least part of the aqueous suspension of particulate matter obtained from each subsequent scrubbing stage in a venturi scrubber with the feed gas of the preceding scrubbing stage to form a mixture of gas and the aqueous suspension.

10. A process as claimed in claim 9, further including the step of:
    separating the mixture of gas and aqueous suspension originating from each venturi scrubber in plural separators, each associated with a different scrubber, into a gas and an aqueous suspension of particulate matter.

11. A process as claimed in claim 10, further including the step of:
    injecting at least part of the aqueous suspension obtained from a first of the plural separators into the hot gas.

12. A process as claimed in claim 10, further including the step of:
    scrubbing the gas originating from a last of the plural separators in a gas scrubbing column countercurrently with water.

13. A process as claimed in claim 12, further including the step of:
    recycling at least part of the aqueous suspension of particulate matter from the gas scrubbing column to a preceding venturi scrubber.

* * * * *